2,960,422
WELDING FLUX

Christopher H. Symonds, Sutton Coldfield, England, assignor to The International Nickel Company, Inc., New York, N.Y., a corporation of Delaware No Drawing. Filed Oct. 8, 1958, Ser. No. 765,952

Claims priority, application Great Britain Oct. 21, 1957

2 Claims. (Cl. 148—26)

The present invention relates to welding, and more particularly to a welding flux for use in welding nickel alloys.

As is known to those skilled in the art, nickel alloys such as nickel-iron-molybdenum and nickel-chromium-molybdenum alloys are widely used in the manufacture of, inter alia, chemical plant and equipment which are required to withstand corrosive attack. Broadly the alloys contain either from 10 to 40% molybdenum and from 2 to 25% iron, or from 14 to 20% molybdenum and 12 to 25% chromium, the balance in either case being substantially all nickel.

These alloys are frequently fabricated by argon-arc or oxy-acetylene welding, and it is known that as a group they are particularly susceptible to oxidation at the welding temperatures. It is consequently necessary with these welding processes to employ some form of backing protection to the parts to be welded so that the side away from the welding torch (the underside) is not heavily oxidized to the detriment of the joint. The backing protection is often provided by fitting metal strips closely around the joint around the underside or by inert shielding gases, but sometimes the nature of the parts that are being welded is such that neither of these methods is practicable. In such cases the application of a flux has been considered the simplest and most efficacious manner of preventing the oxidation of the bead and the adjacent alloy on the underside of the weld. However, the fluxes hitherto used do not satisfy all the requirements. Although attempts were made to overcome the foregoing difficulties and other difficulties, none, as far as I am aware, was entirely successful when carried into practice commercially on an industrial scale.

It has now been discovered that nickel alloys, particularly nickel-iron-molybdenum and nickel-chromium-molybdenum alloys can be welded in a highly satisfactory manner by the use of a flux of special composition, the flux being characterized by a relatively wide melting temperature range, by stability at fusion welding temperature and by the ability to readily absorb metal oxides formed during welding. Moreover, the flux can be easily removed after the welding operation is completed.

It is an object of the present invention to provide an improved welding flux composition for use in welding nickel alloys.

Another object of the invention is to provide an improved welding flux for use in welding nickel alloys, especially nickel-iron-molybdenum and nickel-chromium-molybdenum alloys, the flux being characterized by stability at fusion welding temperatures and in having a relatively wide melting temperature range.

The invention also contemplates providing an improved welding flux which readily absorbs metal oxides formed during the welding process and which can be removed easily and with facility upon completion of the welding operation.

It is a further object of the invention to provide a process for accomplishing the foregoing.

Generally speaking, the present invention contemplates a welding flux of special composition for use in welding nickel alloys, particularly nickel-iron-molybdenum and nickel-chromium-molybdenum alloys. In accordance with the invention, the welding is effected using a flux comprised by weight of from about 40% to about 60% boric oxide, about 13% to about 33% calcium fluoride and about 24% to about 31% potassium fluoride. In carrying the invention into practice, a particularly suitable composition is about 50% boric oxide, about 22% calcium fluoride and about 28% potassium fluoride. The invention includes these fluxes as novel composition.

The oxides formed during the welding of the nickel-iron-molybdenum and nickel-chromium-molybdenum alloys by the argon-arc and oxy-acetylene techniques tend to appear at temperatures as low as 600° C. The individual constitutents of the flux according to the invention are known for their inherent ability to dissolve or absorb metal oxides when they are molten. However, their melting points, namely boric oxide (ca. 875° C.), calcium fluoride (ca. 1350° C.) and potassium fluoride (ca. 850° C.), are not sufficiently low to provide protection of the nickel-molybdenum alloys at temperatures below 800° C. The addition of the calcium and potassium fluorides to boric oxide produces ternary flux compositions with an extended melting range, namely 600° C. to 875° C. In this range of temperature the fluxes used form a viscous blanket over the metal surface. Even at a temperature as high as 900° C. the flux is not highly volatile. Therefore, the fluxes of the invention have the requisite stability at the fusion welding temperatures of the nickel-molybdenum alloys. Moreover, at the end of the welding the fluxes according to the invention leave a glassy flux residue containing dissolved oxides which can readily be removed mechanically or even by thermal shock such as is produced when the welded components are water-quenched.

The present invention is particularly applicable to welding nickel alloys containing about 10% to about 40% molybdenum and at least one metal selected from the group consisting of iron and chromium in amounts of up to about 25% iron and up to about 25% chromium, the balance being substantially nickel. Such alloys include nickel alloys containing about 10% to about 40% molybdenum, e.g., 25% to 30% molybdenum, and about 2% to about 25% iron, e.g., 4% to 7% iron, the balance essentially nickel. Also included are alloys containing about 14% to about 20% molybdenum and 12% to about 25% chromium. As is known, such alloys often contain various amounts of other alloying elements. Thus, as will be understood by those skilled in the art, the expression "balance" used herein to designate the remainder of the alloy in reference to the nickel content thereof does not exclude the presence of other elements commonly present in such alloys for various purposes, e.g., deoxidizing elements, and impurities ordinarily associated therewith, in amounts which do not adversely affect the basic characteristics of the alloys. For example, up to 2.5% vanadium, e.g., 1.1% to 2.3% vanadium, up to 3% manganese, e.g., 0.1% to 0.5% manganese, up to 1% silicon, up to 5% cobalt, up to 10% tungsten, up to 0.25% carbon, preferably up to 0.15% carbon, can be present in the alloys.

It is to be observed that the present invention provides an eminently suitable flux composition for welding nickel alloys and particularly the nickel alloys described herein. The relative stability of the flux during welding, its ability to readily absorb molten oxides during the welding operation and the relative ease with which the flux can be removed from the welded parts because it forms a glass-like residue, all contribute to achieving very satisfactory results in accordance with the invention.

Although the present invention has been described in conjunction with preferred embodiments, it is to be understood that modifications and variations may be resorted to without departing from the spirit and scope of the invention, as those skilled in the art will readily understand. Such modifications and variations are considered to be within the purview and scope of the invention and appended claims.

I claim:

1. A welding flux suitable for use in welding nickel-base alloys, said flux consisting essentially of about 40% to about 60% boric oxide, about 13% to about 33% calcium fluoride and about 24% to about 31% potassium fluoride, the flux being characterized in having a melting point as low as 600° C. and as high as about 875° C. and being substantially non-volatile at temperatures as high as 900° C.

2. A welding flux suitable for use in welding nickel-base alloys, said flux consisting of about 50% boric oxide, about 22% calcium fluoride and about 28% potassium fluoride, the flux being characterized in that it is substantially non-volatile at temperatures up to about 900° C.

References Cited in the file of this patent

UNITED STATES PATENTS

| | | |
|---|---|---|
| 1,981,798 | Bonsack | Nov. 20, 1934 |
| 2,322,416 | Coleman et al. | June 22, 1943 |
| 2,520,206 | Goerg | Aug. 29, 1950 |

FOREIGN PATENTS

| | | |
|---|---|---|
| 378,802 | Great Britain | Aug. 18, 1932 |

OTHER REFERENCES

Welding Principles for Engineers, Morris, pages 250–271, 1951.